Patented Mar. 7, 1950

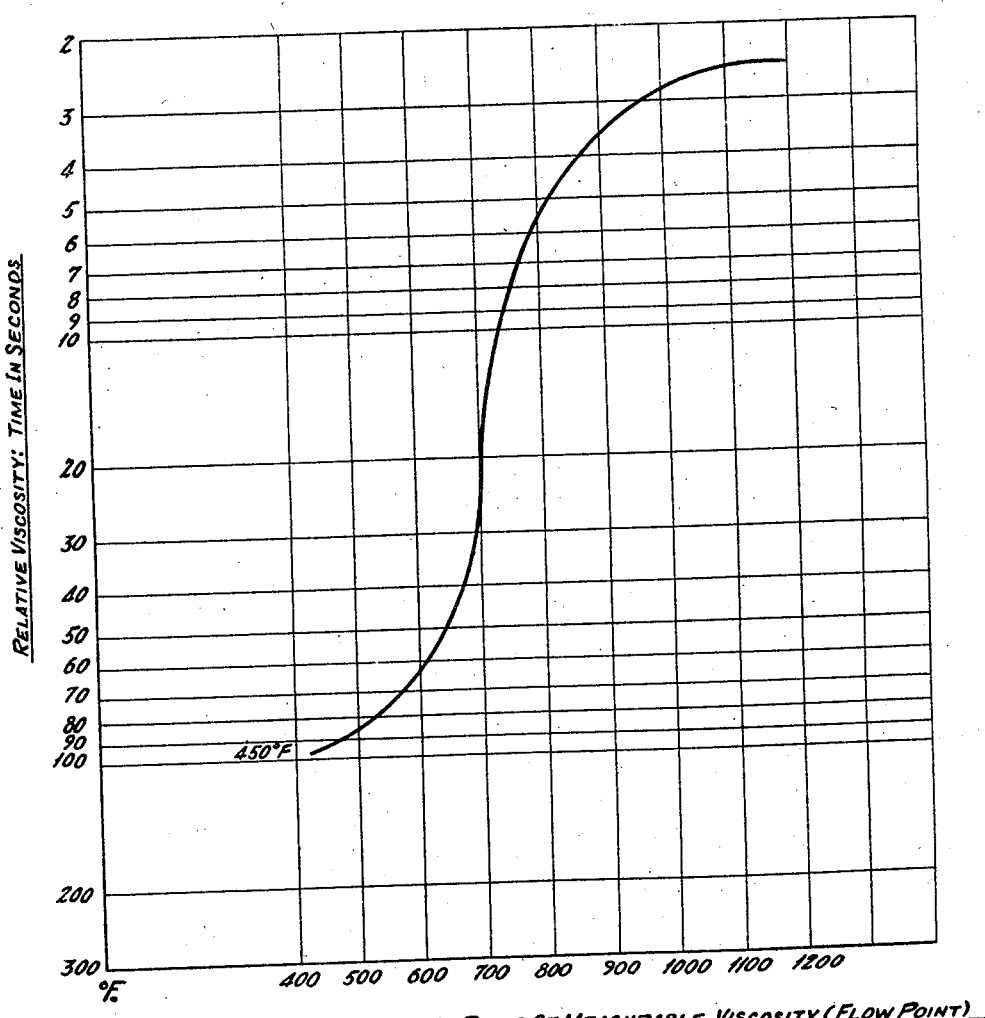

2,499,641

UNITED STATES PATENT OFFICE 2,499,641

BRAZING AND HARD SOLDERING FLUX

Robert B. Goody, New York, N. Y., assignor to Monroe Sherman, Flushing, N. Y.

Application December 22, 1945, Serial No. 636,965

2 Claims. (Cl. 148—26)

My invention relates to fluxes used in the brazing, welding and hard soldering processes.

Most metals, and alloys thereof, when heated, form surface oxides, the effect of which is to prevent the formation of a satisfactory joint when such joints are brazed, hard soldered or welded. Fluxes are used not only to prevent the formation of these obstructive oxides, but also to dissolve those oxides already present on the metals or caused to form thereon by the heating of the metals during the brazing, hard soldering or welding processes. Fluxes function by forming a thin protective film or layer over the surfaces of the metals being worked, to prevent access of air thereto, and to promote the flow and spread of the welding or brazing alloys, and it is obvious, therefore, that the lower the temperature at which the flux will become fluid and free flowing, the more effectively it will operate to remove the existing surface oxides and prevent the formation of additional oxides, and also to promote more rapid and thorough flow of the welding or brazing materials.

Fluxes are known which melt and flow freely at temperatures up to 550° F., but these are designed for use only in connection with soldering the relatively soft lead- and tin-containing metals, or metals and alloys of the group commonly known as soft solders. These fluxes almost always contain rosin, ammonium chloride and/or zinc chloride, and when heated at temperatures above 550° F., they decompose and break down. Such "soft" solder fluxes, therefore, are entirely useless for operations which are to be carried out at elevated temperatures of between 800° F. and 1500° F., or higher.

Fluxes are commercially available for use in silver brazing, but these—although they begin to melt and flow at temperatures above 700° F.—do not possess sufficient fluidity and do not form the desired thin protective film until heated beyond 1000° F. These fluxes usually contain borax, boric acid and a metal fluoride, which, when heated liberate objectionable quantities of noxious fumes against which the worker must take precautions to protect the mucuous membranes of the eyes, mouth, nose, and the skin. The art has repeatedly noted this difficulty with fluoride-containing fluxes, and many attempts have been made in the past, with no appreciable success, to overcome this objection.

The main object of my invention, therefore, is to provide a flux which is stable and active at temperatures over the range of from 450° F. to 1650° F.

Another object of my invention is the provision of a flux which will not release irritating and noxious fumes, which has a low surface tension and an extremely low viscosity which will allow the flux to flow freely even at low temperatures of between 450° F. and 800° F., so as to thoroughly wet the surfaces of the metals being worked and thus improve the capillary action of the welding or brazing alloy.

Still another object of my invention is the provision of a flux comprising boric acid, a metallic borate, a metallic fluoborate, and an alkali carbonate.

Other and further objects of my invention will in part be obvious, and still other objects will be specifically pointed out in connection with the following description of an illustrative embodiment.

I have found that when a flux composed of metallic fluoborates, boric acid and alkali borates, intimately mixed together in finely subdivided form, is subjected to elevated temperatures, a decomposition of the fluoborates takes place, resulting in the formation and release of large amounts of noxious fumes. Despite the relatively low temperatures at which such a flux will melt and flow, the necessity for precautionary measures against the noxious fumes renders the flux impractical. I have found that all of the advantages of this type of flux can be retained, and all of its disadvantages eliminated or overcome by the addition of another compound to the mixture, and by subjecting the resulting admixture to a series of steps new in the art of forming fluxes.

In accordance with my invention, a metallic fluoborate, boric acid, an alkali borate (preferably but not necessarily in fused ground glass form), and an alkali carbonate are thoroughly admixed together in finely subdivided form until homogeneity is attained throughout the mixture. The material is then charged into a suitable container and subjected to heat at elevated temperatures until complete fusion in a liquid state has taken place. A thermal effect is observed during this heating period, which continues in situ until all the ingredients are completely dissolved. The liquid mass is then cooled, solidifying in a friable, glass-like mass, which is then crushed and ground down into fine particle size. The resulting powder is then mixed with water, spirits, or any other suitable carrier or solvent. The addition of water to form a paste is only to facilitate ease of application to the metal surfaces to be covered by the flux. All of the unique and desirable properties and qualities of my flux are present in the dry powder form, and where desired the flux may be used in such dry powder form.

Exactly what occurs during the heating and the consequent thermal effect is not clearly known or understood, except that I believe that the alkali carbonate decomposes the fluoborate in situ, for there is no formation or release of any noxious fumes during the heating steps. Furthermore, tests do not reveal the presence of any free carbonates after the completion of the fusion.

I have found that highly satisfactory products may be achieved if my components are mixed within the following range of proportions:

|  | Per cent |
|---|---|
| Metallic fluoborate | 30 to 90 |
| Boric acid | 3 to 40 |
| Alkali borate | 3 to 40 |
| Alkali carbonate | 3 to 40 |

Within these general ranges, I have found that the following specific proportions of my ingredients result in a flux having all the properties and advantages of my invention:

|  | Per cent |
|---|---|
| Potassium fluoborate, approximately | 65 |
| Anhydrous boric acid, approximately | 11.25 |
| Anhydrous sodium borate (borax glass) approximately | 11.25 |
| Potassium carbonate, approximately | 10.50 |

I have found, further, that the following specific composition also results in a flux having all the desirable qualities and properties above referred to:

|  | Per cent |
|---|---|
| Potassium fluoborate | 67 |
| Anhydrous boric acid | 11 |
| Anhydrous sodium borate (borax glass) | 11 |
| Potassium carbonate | 11 |

Anhydrous potassium borate may be substituted for the anhydrous sodium borate in the above composition.

While I have set forth, in the general ranges and in the specific examples given hereinabove, the use of alkali borate, and the use of anhydrous sodium borate, commonly known as borax glass, I may use instead thereof—and within the teachings of my invention—sodium metaborate, sodium tetraborate, sodium pentaborate, or potassium metaborate, potassium pentaborate or potassium tetraborate; however, allowance must be made for the difference in weight because of the absence of water of crystallization in the ground borax glass, which water in the hydrous borates is lost during the thermal action. I have used the term "alkali borate" in the description hereinabove and in the claims to denote the use of either the borax glass, anhydrous, or the hydrous borates, as equivalents, subject to the weight differential. I prefer to use alkali boron oxides in the form of fused ground glass, although—as recited above—borax in ordinary hydrous form gives good results also.

I have also found that alkali fluorides may be used in my product instead of the fluoborates, but the resulting flux, while a definitely usable, practical product within the scope of my teachings, has a much higher melting point and a much higher viscosity than when the fluoborates are used.

When conventional fluxes are used, a bubbling action occurs during the early application of heat to the fluxed area, due to the evolution of steam that is present in the flux as water. As the heating continues, the materials forming the flux produce an effervescence, a bubbling from within, resulting in gas bubbles, and at this same stage, there is a progressive expansion of and spreading of the flux. The flux components react violently with each other, and the bubbling increases the volume of the flux mass to a marked extent, liberating gases which in the case of a closed joint tend to prevent the formation of as strong a joint as desirable, and as securable in the absence of the gases, since these gas bubbles retard the flow of the brazing or welding alloy.

The fluidity of fluxes, i. e., their flowability, is a very important property thereof, for in order to insure good welding and brazing, the flux must aid rather than hinder the flow of metal through and over the joint area, and if the flux used has a high viscosity, it will operate to prevent the free flow of metal where desired and/or needed.

I have compared the flux made in accordance with my invention with conventional fluxes, commercially available, and have found that my flux starts to melt and flow at about 450° F. while the other fluxes examined will not start to melt or flow to any appreciable degree until heated to temperatures of the order of 900° F. or 1000° F. One such conventional flux examined comprises an alkali fluoborate (20% to 85%) and an alkali borate (15% to 70%), and will be referred to hereinbelow as flux A. A second conventional flux contained potassium fluoride (20% to 40%), water (4% to 20%), borax and boric acid, which will be referred to hereinbelow as flux B. A third commercially available flux contained about 50% of potassium acid fluoride, and about 20% potassium carbonate, with the remainder thereof consisting substantially of boric acid, which will be referred to hereinbelow as flux C.

The tests to which I subjected my flux, and these other fluxes, were directed to determining the relative viscosity thereof; that is, to determine the amount of time it takes a measured quantity of molten flux material to flow through a standard size orifice in a standard container at certain temperatures.

The drawing annexed hereto and forming a part hereof consists of a chart illustrating graphically what I found when I heated my flux progressively from 450° F. all the way up to 1200° F. At about 450° F. there was a definitely noticeable melting, and the decrease in viscosity is clearly measurable. My flux starts to melt at about 400° F., but the flux is still at a high viscosity. This viscosity changes rapidly with even slight changes in temperatures, so that at a temperature of 650° F. the flux has a viscosity so low that it will flow through the standard orifice in about 60 seconds. At this particular temperature, fluxes A, B and C take an infinite amount of time to flow through the standard orifice. When the temperature is raised to 700° F., the viscosity of my flux has dropped so low that it flows through the standard orifice in about 22 seconds. If 22 seconds is taken as a standard for determining the relative viscosity of my flux as compared with the other three fluxes tested, only my flux will pass through the standard opening at 700° F., and the temperature must be raised to 1000° F. for flux A to pass through; to between 1000° F. and 1100° F. for flux C to pass through; and to 1200° F. for flux B to pass through the standard orifice.

This difference in viscosity is not so much one of degree, as it is in kind, for the changes in viscosity level in relation to temperature are not comparable at all. My flux has a so much lower melting point, a so much lower viscosity, does not produce gases at the time of melting, avoids the inner bubbling which causes flux effervescence and displacement as a result thereof, and remains stable and unaffected over so much a greater heat range than any flux heretofore known, that it is obvious that the product made in accordance with my teachings is a new kind of flux. The tackiness and heaviness of the conventional fluxes, when compared with mine, renders them definitely and measurably less effective in forming the desired thin protecting film over the area to be worked at the highly desirably early stages and low temperatures; and in the same sense, these conventional fluxes prevent or retard the smooth flow and distribution of the brazing or welding metal over the area.

Another factor in which my flux differs radically from the conventional fluxes is that of relative acidity or alkalinity. The corrosive effect of too acid or too alkali fluxes is too well known to call for any elaboration, but it should be noted that whereas my flux is relatively neutral, with a pH of between 5 and 6, conventional fluxes are infinitely more acid or alkaline.

With the flux of my invention, a thin, clear, liquid glassy protective surface is produced on the parent metals, which coating readily removes the oxides present thereon or formed thereon during the heating. On cooling, my flux contracts rapidly and produces internal surface cracking. When cooled to room temperatures, it is easy to remove the flux simply by striking the parent metal, when the flux flakes off. The flux can also be removed from the parent metal by washing in water. Since my flux is more nearly neutral tone than standard fluxes, no additional wash of an acid or alkali nature is necessary to neutralize the corrosive effects thereof.

Having now described my invention, what I claim and desire to secure by Letters Patent is:

1. A flux for brazing and hard soldering consisting of the fusion product of 30% to 90% by weight of an alkali metallic fluoborate, the remainder consisting of substantially equal amounts of an alkali borate, boric acid and an alkali carbonate.

2. A flux for brazing and hard soldering consisting of the fusion product of 67% by weight of potassium fluoborate, 11% of anhydrous boric acid, 11% of anhydrous potassium borate, and 11% of potassium carbonate.

ROBERT B. GOODY.

REFERENCES CITED

The following references are of record in the file of this patent:

UNITED STATES PATENTS

| Number | Name | Date |
|---|---|---|
| 1,835,965 | Phelan | Dec. 8, 1931 |
| 2,267,762 | Streicher | Dec. 30, 1941 |
| 2,322,416 | Coleman et al. | June 22, 1943 |
| 2,357,014 | Merlub-Sobel et al. | Aug. 29, 1944 |